UNITED STATES PATENT OFFICE.

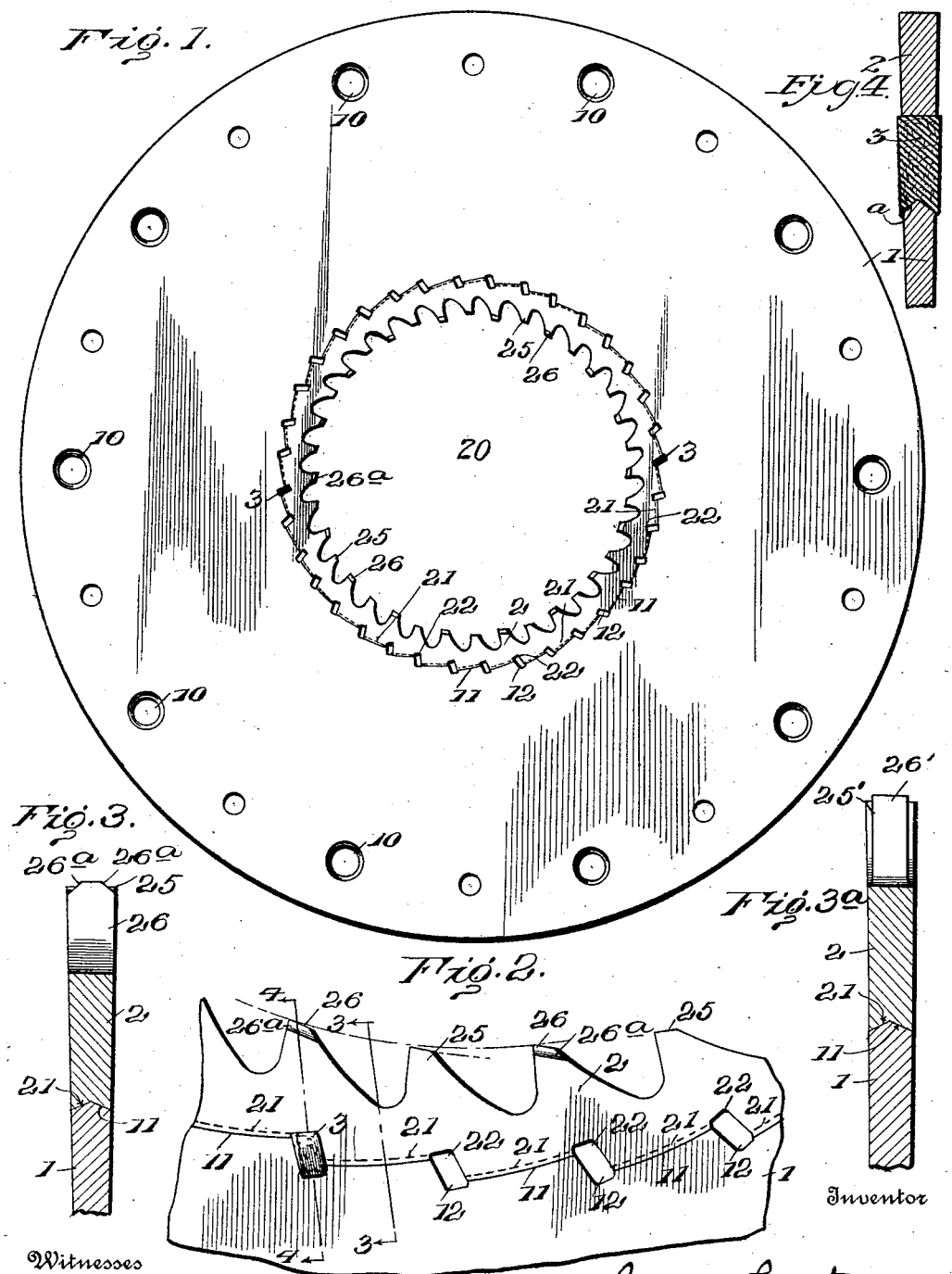

GEORGE GORTON, OF RACINE, WISCONSIN.

ROTARY METAL-CUTTING-OFF DEVICE.

1,033,003.  Specification of Letters Patent.  Patented July 16, 1912.

Application filed May 27, 1911. Serial No. 629,818.

*To all whom it may concern:*

Be it known that I, GEORGE GORTON, a citizen of the United States, residing at Racine, Racine county, Wisconsin, have invented certain new and useful Improvements in Rotary Metal-Cutting-Off Devices; and I do hereby declare the following to be a full, clear, and exact description of the invention, such as will enable others skilled in the art to which it appertains to make and use the same.

This invention relates to certain improvements in and relating to rotary cutting-off devices, and the like; and the objects and nature of the invention will be readily understood by those skilled in the art in the light of the following explanation of the accompanying drawings illustrating what I now consider to be my preferred embodiment from among other formations and arrangements within the spirit and scope of my invention.

An object of the invention is to provide an improved rotary cutting off device having cutters and holding means therefor exceedingly thin or of minimum thickness to produce an exceedingly narrow kerf, which will be durable in construction, economical in upkeep, and of high speed capacity, and wherein the cutting element or elements will be renewable and will have capacity for a maximum number of sharpening operations, and yet will be of such economical construction as to warrant renewal thereof as necessary.

A further object of the invention is to produce a rotary cutting off device of the internal or central work-receiving opening type involving means whereby the cutting elements are all carried by an annular cutter table or ring removably arranged in the central opening of a blade or other holder so that the cutter blade can be readily removed from the holder with all of the cutters for sharpening or renewal.

A further object of the invention is to provide a rotary metal cutting off saw wherein the cutting elements are all carried by a thin ring or annular cutter blade removably carried by a blade or holder, wedging surfaces being provided between the holder and cutter blade, whereby the cutter blade can be readily removed or applied with all of the cutters.

A further object of the invention is to provide certain improvements in rotary cutting off devices of the internal saw type for the purpose of so cheapening the cutting element construction while maintaining the capacity, efficiency and durability thereof for the purposes intended, as to produce a high speed rotary metal cutting off device capable of competing with the cheap power hack saws in original cost when compared with capacity and upkeep cost.

A further object of the invention is to provide certain improvements in arrangements and formations whereby an improved and highly efficient rotary cutting off device will be produced.

The invention consists in certain novel features in construction, and in arrangements and combinations of parts as more fully and particularly set forth hereinafter.

Referring to the accompanying drawings;—Figure 1, is a side elevation of a cutter blade and the holding blade therefor, said parts being shown assembled. Fig. 2, is an elevation of a portion thereof. Fig. 3, is a section on an enlarged scale on the line 3—3, Fig. 2. Fig. 3ª, is a view corresponding to Fig. 3, and showing a modified cutter or tooth formation. Fig. 4, is a section on an enlarged scale on the line 4—4, Fig. 2.

In the embodiment of my invention illustrated, in the drawings, I provide a disk or blade 1, constituting the holder or holding blade for a comparatively thin narrow annular cutter blade or ring 2, carrying or provided with the cutters or teeth.

The holding blade is comparatively thin to enter the cut or kerf formed by the cutters in the work, and is adapted to be firmly secured, as at points 10, at its outer circumferential portion to suitable rotary holding and driving means, for instance, to the hollow hub of a driving gear. This holding blade is formed with an enlarged central opening to receive the cutter blade which is formed with a central work receiving opening 20, surrounded by the cutters arranged around the inner edge of the cutter blade. The inner edge of the holding blade and the outer edge of the cutter blade are relatively formed to fit, wedge or lock together to bring the two blades into the same plane and so that the holding blade forms a shock or thrust receiving platen, backing or support for the cutter blade and also forms a driving connection for the cutter blade. These interfitting or locking edges of the two blades are also so formed as to provide for comparatively easy removal and application of the cutter blade. For instance, I show the inner edge of the holding blade throughout the circle thereof formed to present an annular series of uniform similar comparatively short tangential or rearwardly and inwardly inclined wedging surfaces or edges 11, with intervening notches, shoulders or recesses 12, between the high and low ends of the inclines 11. The outer edge of the cutter ring is throughout the circle thereof correspondingly formed with an annular series of opposed forwardly and outwardly inclined wedging surfaces or edges 21, separated by intervening notches, shoulders or recesses 22, which coincide with the corresponding recesses 12, of the holding blade to form transverse clearance holes or openings in the completed saw or cutter when the cutter blade is in operative position, although I do not wish to so limit all features of my invention.

The tangential or wedging edges 11, 21, are preferably longitudinally formed to interlock against lateral or transverse separation and to center the cutter blade in the holding blade. To this end these edges can be longitudinally tongued and grooved about as shown, for instance, I show the cutter blade edges 21, formed throughout their lengths with V-grooves and the holding blade edges 11, formed throughout their lengths with V-tongues or ribs. These ribs and grooves are of such depth and the wedging surfaces 11, 21, are so arranged, that the cutter blade can be placed laterally into the central opening of the holding blade with the approximately radial edges of the recesses 12, about engaging the radial edges of the recesses 22. Rearward or backward (with reference to the direction of cutting or operative rotation of the saw) axial or rotative movement of the cutter blade in the holding blade will then bring the edges 11, 21, into operative wedging and locking engagement and this engagement will be tightened by the thrust of the cutters in action. When it is desired to remove the cutter blade, rotative or axial movement of the blade forwardly in the holding blade will release the wedging edges or surfaces and loosen the blade so that it can be released laterally from the holding blade.

For the purpose of holding or locking the cutter blade against possibility of accidental retrograde or loosening rotative movement in the holding blade, I can insert stop or holding means in one or more of the clearance spaces or openings, formed by recesses 22, 12. For instance, I show two diametrically opposite clearance spaces or openings filled or plugged with soft metal forming soft metal rivets or plugs 3. The side faces of the blades are beveled (see $a$) Fig. 4 at the ends of the recesses to form the clearance openings that are to receive said rivets slightly flaring at the ends to hold the rivets therein. These rivets are easily formed by running molten soft metal into said recesses or by placing soft metal plugs therein and then upsetting the ends thereof. The soft metal rivets can be easily dislodged when a cutter blade is to be removed. I do not however wish to limit all features of my invention to the employment of locking means, such as stops, plugs or rivets, although I find them to be features of utility and advantage where very thin cutter and holding blades are employed to form a very narrow kerf in the work, and thereby necessitating the employment of wedging surfaces or edges of comparatively heavy or excessive taper or inclination to properly back and support the cutter blade.

In the embodiment of Fig. 1, the cutter blade is composed of suitable steel or alloy to permit the formation of metal cutting teeth or cutters of the material of said blade and integral therewith. I show the inner edge portion of said blade formed into inwardly extending teeth or cutters 25, 26, usually so arranged with respect to the wedging surfaces or edges 11, 21, as to provide approximately a pair of abutting surfaces 11, 21, for each cutter. Each pair of abutting surfaces can be arranged approximately in the line of strain on a cutter as said cutter acts on the work. In other words, the cutter blade can be backed or supported behind each cutter by surfaces 11, 21, to directly sustain the thrust of each cutter while at work, and thereby relieve the cutter blade as a whole from strain tending to buckle, dish or crush the same.

The cutters 25, 26, are preferably alternately wide and short, and narrow and long at their cutting or working points. The cutters 26 project inwardly at their working points slightly beyond the circle of movement of the cutters 25 and are slightly narrower at their points than cutters 25, to operate in a manner well understood by those skilled in the art. The cutters 26 are in operation subjected to greater breaking strain than the cutters 25, which cut only at their corners, inasmuch as the long narrow point cutters 26, cut or take chips the full width of their points. This weakness can be avoided by forming all cutters 25, 26 of approximately the same thickness and then beveling off the corners (see 26$^a$) of every alternate cutter to form the narrow point cutters 26. This formation is shown in detail in Fig. 3.

In Fig. 3$^a$, I show the ordinary formation of narrow and wide tooth arrangement which of course can be employed in the cutter blade.

Cutting saws or devices formed in accordance with my invention have high speed capacity and are exceedingly durable and can be very economically produced and operated. The cutter blades will stand sharpening a maximum number of times and yet are of such low cost that after repeated sharpening they can be discarded and new cutter blades substituted at slight expense. In fact, saws of this invention will be more economical in first cost and upkeep in view of their output than the common power hack saws which are in such general use because of their cheapness.

It is evident that various changes and modifications might be resorted to without departing from the spirit and scope of my invention, and hence I do not wish to limit myself to the exact disclosure hereof.

Desiring to protect my invention in the broadest manner legally possible, what I claim is:

1. A rotary cutting-off device comprising a holding blade having cutter-ring-driving-and-locking edge wedging surfaces, and a removable cutter ring provided with cutters and applied to said blade and having portions riding on said wedging surfaces.

2. A saw or cutting off device having a central work receiving opening, and comprising a blade provided with a removable cutter ring having cutters, the blade and ring edges having series of short interlocking coöperating thrust-receiving and ring-tightening inclines backing said cutters.

3. A rotary cutting-off device comprising a holding blade and a cutter ring removably applied thereto and carried thereby and provided with cutters, the blade edge formed with tangential ring-tightening surfaces corresponding to and backing the cutters, respectively.

4. A holding blade provided with an annular series of tangential wedging edges, in combination with a removable cutter ring having a corresponding annular series of tangential wedging surfaces and provided with cutters.

5. A holding blade having one edge completely around the circle thereof formed into a series of tangential wedging surfaces and intervening shoulders, in combination with a cutter ring provided with an annular series of cutters at one edge and at the opposite edge completely around the circle thereof formed into a series of tangential wedging surfaces and intervening shoulders corresponding to said surfaces and shoulders of said blade.

6. A saw comprising a holding blade, a removable cutter ring fitted thereto and provided with a series of cutters, said ring and blade formed with corresponding interfitting inclined surfaces, and locking plugs fitting between the holding and cutting blades.

7. A saw comprising a holding blade, a removable cutter ring fitted thereto and provided with cutters, said ring and blade formed with abutting inclined surfaces and with corresponding recesses forming transverse openings, and a removable rivet in one of said openings.

8. A rotary saw comprising a holding blade, a cutter blade removably fitted thereto and provided with cutters, said blades formed with abutting inclined wedging edges, and with corresponding recesses forming transverse clearance openings.

9. A rotary cutter having a holder, and a removable cutter ring provided with cutters projecting from one edge thereof, the corresponding abutting edges of the holder and ring formed with a series of tangential surfaces backing the portions of the ring provided with the cutters for receiving the thrust of the cutters while in action.

10. A saw blade having its edge formed with a series of eccentric uniformly-spaced longitudinal inclines, and a cutter ring applied to said blade edge and tightened thereon by retrograde rotation whereby the ring rides on said inclines and is thereby tightly wedged to the blade and is rendered removable by loosening rotation in the opposite direction, and removable means for preventing loosening rotation of the ring on said inclines.

11. A rotary holder having a central work receiving opening surrounded by a series of cutter ring driving, thrust-receiving and tightening abutments, in combination with a removable cutter ring having cutters and applied to said holder around said opening and having its outer surrounding edge formed with portions wedging on said abutments to tighten and wedge the ring in the holder and sustain the thrust of the cutters in action.

12. A rotary holder having a circumferential series of wedging surfaces, in combination with a removable cutter ring having a corresponding series of wedging surfaces about its edge riding on said surfaces of the holder to wedge the ring to the holder by relative rotary movement of the holder and ring, said holder and ring forming intervening clearance openings.

13. A rotary holder having a central work receiving opening, in combination with a removable cutter ring wedged in said holder around said opening, said holder and ring having coöperating abutting wedging surfaces locking the ring in the holder by the wedging action of said surfaces on relative rotary movement of the holder and ring.

14. A rotary driving member having a series of edge abutments, a removable cutter ring provided with cutters and fitted to said member and having edge portions to engage said abutments and in connection therewith to form transverse openings between the ring and member, and a removable filler in one of said openings.

15. A rotary member having a work receiving opening, a cutter ring having cutters and removably fitted to said member and about said opening, and a removably transverse soft metal filler between the ring and member.

16. A saw comprising a blade having a central work-receiving opening, and a removable cutter ring fitted thereto and formed with cutters integral therewith and projecting into said opening, said blade and ring formed with coöperating surfaces locking the ring to forward rotation with the blade and backing the portions of the ring formed with the cutters.

In testimony whereof I affix my signature, in presence of two witnesses.

GEORGE GORTON.

Witnesses:
C. ERLANDSON,
C. R. CARPENTER.

Copies of this patent may be obtained for five cents each, by addressing the "Commissioner of Patents, Washington, D. C."